F. C. WYCKOFF.
Sink for Oil-Casks.
No. 165,399. Patented July 6, 1875.
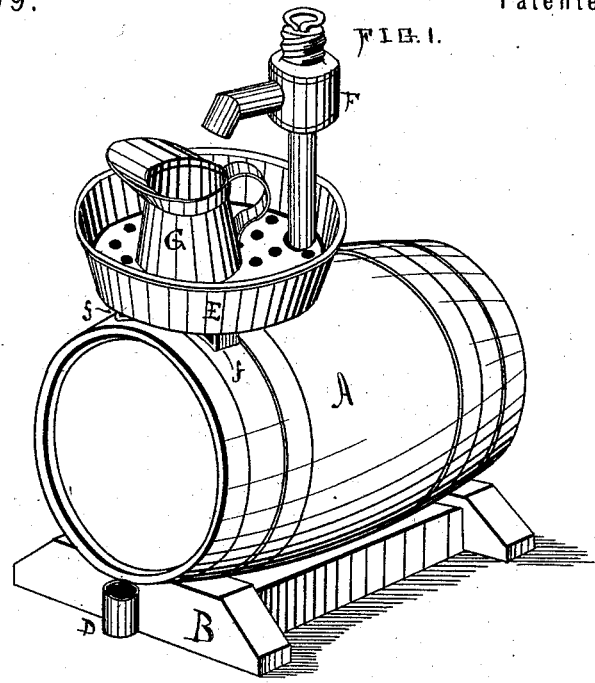
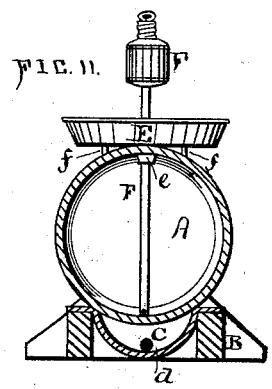
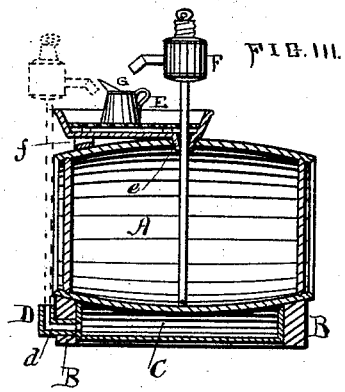
WITNESSES.
F. B. Townsend.
Geo. D. Wyckoff
INVENTOR
Frank C. Wyckoff
By his atty
R. D. O. Smith

UNITED STATES PATENT OFFICE.

FRANK C. WYCKOFF, OF NEW YORK, N. Y.

IMPROVEMENT IN SINKS FOR OIL-CASKS.

Specification forming part of Letters Patent No. 165,399, dated July 6, 1875; application filed March 23, 1875.

*To all whom it may concern:*

Be it known that I, FRANK C. WYCKOFF, of New York, in the State of New York, have invented a Sink for Oil-Casks, of which the following is a specification:

It is well known that kerosene-oil is exceedingly volatile and subtile, and that the handling of barrels containing it, during transportation, generally causes the staves to start sufficiently to produce more or less leakage; and also that the oil will easily penetrate through the pores and cells of the wood, if at any point the surfacing has exposed or cut across the grain. The retail dealers suffer great loss from this constant leakage, especially in warm weather, when said leakage is liable to be greatest. The ordinary methods of dispensing the oil referred to, by drawing it off by means of stop-cocks, is also a source of considerable loss on account of the waste from drip and overrun measures, &c.

The object of my invention is to guard against both these sources of loss—first, by placing the barrel upon skids provided with a drip-pan or tray, and means whereby the leak-oil may be readily pumped back into the barrel; and, second, by a cheap but efficient sink or pan provided with a taper neck to fit tightly into and fill the bung-hole, through which overflow or drip oil may escape back into the barrel, and a pump of suitable size and structure to enter the barrel through said neck, for the purpose of pumping off the oil when required.

That others may fully understand my invention, I will particularly describe it, having reference to the accompanying drawings.

Figure 1 is a perspective view of my invention in full operative position. Fig. 2 is a transverse section of same. Fig. 3 is a longitudinal section of same.

A is the ordinary oil-cask, resting upon the skids B, which are constructed in the usual way. A pan or tray, C, with its bottom sloping toward the front end, is placed between the side bars of the skids, and secured thereto in any convenient manner. At the front end of the pan C there is a small pipe, d, leading from said pan to the well D, secured to the outer side of the front bar of the skids. The well D extends upward as high as the top edge of the pan C, and into it the oil will run as it drips into said pan. The quantity of oil in the said well and pan will therefore be plainly visible, and at such times as may be necessary or convenient the ordinary oil-pump may be placed in said well and the oil pumped back into the barrel. This operation is shown by dotted lines in Fig. 3.

On top of the barrel I place a sink, E, composed of a plain circular or oval pan provided with a funnel outlet-neck, e, near one edge, of proper and sufficient size to enter and fit tightly in the ordinary bung-hole of the cask. At the opposite edge of the pan E there are two feet or legs, $ff$, which rest upon the cask at or near the chine, and are sufficiently long to cause the bottom of the pan to incline slightly toward the funnel e, and thereby cause any drip or overflow of oil to drain back into the cask. The pump F is inserted loosely through the funnel e into the barrel A, and the contents may thereby be pumped out as required. The measures G may be conveniently kept standing in the pan or sink E when not in use.

The advantages of my device are, first, cheapness of construction, whereby the numerous small dealers may avail themselves of all the advantages which the so-called oil-cabinets possess in convenience and economy or saving of waste; second, the saving of leakage and drip upon the floor; third, the easy and convenient return of all the leak and drip oil from the pan C to the barrel; fourth, the pump will never empty the cask completely, and the residue is usually discharged by holding the barrel up and allowing the oil to run out into a vessel. With my device it is only required to roll the barrel in its seat on the skids, and thus empty the residue into the pan C, whence it may be returned to the new barrel, to be placed thereover at leisure.

I am aware that an "oil-cabinet" has heretofore been made adapted to stand upon and be rigidly attached to a common oil-barrel; but said device has no provision for saving the leakage from the barrel, and its structure is so complicated and costly as to place it beyond the reach of the smaller dealers, for whose benefit my invention is particularly designed.

Having described my invention, what I claim as new is—

1. The pan C, provided with a well, D, combined with the skids B for an oil-barrel, substantially as set forth.

2. The pan or sink E, provided with a single funnel-neck, e, and legs f f, combined with the pump F, as set forth.

3. An oil-cabinet composed of a pan, C, secured to the skids B, and provided with the well D, combined with the sink E, constructed with legs f f and funnel-neck e, and provided with a pump, F.

F. C. WYCKOFF.

Witnesses:
R. D. O. SMITH,
GEO. D. WYCKOFF.